United States Patent
Zhang et al.

(10) Patent No.: US 11,709,303 B2
(45) Date of Patent: Jul. 25, 2023

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventors: Peng Zhang, Hubei (CN); Guanghui Liu, Hubei (CN); Chao Wang, Hubei (CN); Jiedong Han, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 393 days.

(21) Appl. No.: 17/051,343

(22) PCT Filed: Aug. 28, 2020

(86) PCT No.: PCT/CN2020/112108
§ 371 (c)(1),
(2) Date: Oct. 28, 2020

(87) PCT Pub. No.: WO2022/032738
PCT Pub. Date: Feb. 17, 2022

(65) Prior Publication Data
US 2023/0088587 A1    Mar. 23, 2023

(30) Foreign Application Priority Data
Aug. 14, 2020   (CN) .......................... 202010817413.4

(51) Int. Cl.
*F21V 8/00*       (2006.01)

(52) U.S. Cl.
CPC ............. *G02B 6/002* (2013.01); *G02B 6/003* (2013.01); *G02B 6/004* (2013.01); *G02B 6/0025* (2013.01); *G02B 6/0031* (2013.01)

(58) Field of Classification Search
CPC ...... G02B 6/002; G02B 6/0025; G02B 6/003; G02B 6/0031; G02B 6/004
See application file for complete search history.

(56) References Cited

U.S. PATENT DOCUMENTS

| 10,768,356 B1 | 9/2020 | Zhang et al. |
| 2002/0048163 A1* | 4/2002 | Kawakami ........ G02F 1/133615 |
| | | 362/608 |

(Continued)

FOREIGN PATENT DOCUMENTS

| CN | 104036726 A | * 9/2014 | ........... G09G 3/2074 |
| CN | 110187559 A | 8/2019 | |

(Continued)

OTHER PUBLICATIONS

Yang, Fei English Translation of CN104036726 (Year: 2014).*
Ilim, Jae Keun English Translation of KR20100088962 (Year: 2010).*

*Primary Examiner* — Donald L Raleigh (57) ABSTRACT

The present application provides a backlight module and a display device. The backlight module includes a first backlight assembly and a second backlight assembly. The second backlight assembly is provided with a backlight hole, and at least a portion of the first backlight assembly is accommodated in the backlight hole. The first backlight assembly includes a first light source and a light guide element. The light guide element is used to guide a light beam from the first light source, which enters the light guide element, out of the backlight hole, so that the light is evenly distributed in the backlight hole, and a full-screen display design of the display device is realized.

19 Claims, 3 Drawing Sheets

(56) References Cited

U.S. PATENT DOCUMENTS

| | | | | |
|---|---|---|---|---|
| 2003/0076669 A1* | 4/2003 | Itoh | ............... | G02B 6/0068 362/621 |
| 2005/0265028 A1* | 12/2005 | Creemers | ............. | G02B 6/0036 362/297 |
| 2018/0203299 A1* | 7/2018 | Wang | ................ | G02F 1/133606 |
| 2021/0072594 A1 | 3/2021 | Zhang et al. | | |
| 2021/0072599 A1 | 3/2021 | Mei et al. | | |

FOREIGN PATENT DOCUMENTS

| | | | | | |
|---|---|---|---|---|---|
| CN | 110441947 | A | | 11/2019 | |
| CN | 110515237 | A | | 11/2019 | |
| CN | 110658582 | A | | 1/2020 | |
| CN | 111198458 | A | | 5/2020 | |
| CN | 210605287 | U | | 5/2020 | |
| CN | 211014935 | U | | 7/2020 | |
| KR | 20100088962 | A | * | 8/2010 | ......... G02F 1/13357 |
| KR | 20170047980 | A | | 5/2017 | |

\* cited by examiner

BACKLIGHT MODULE AND DISPLAY DEVICE

FIELD OF DISCLOSURE

The present application relates to display technology and in particular, to a backlight module and a display device.

DESCRIPTION OF RELATED ART

As consumers have increasingly higher expectations of display devices, there has been a trend to improve a screen ratio of display devices. A backlight hole design in a backlight module can not only satisfy photosensitive requirements of a functional assembly such as an optical assembly, but also realize a full screen design of the display device, so the backlight hole design has attracted much attention.

The backlight hole of the backlight module of the conventional display device is only used as a channel for receiving ambient light. When an optical assembly does not need to satisfy photosensitive requirements, a display panel of the display device cannot display normally in an area corresponding to the backlight hole, thus failing to provide full-screen displays.

Therefore, there is an urgent need for a backlight module and a display device which can solve the above technical problems.

SUMMARY

The present application provides a backlight module and a display device for solving the following problem: a display panel of a conventional display device cannot display normally in an area corresponding to a backlight hole of a backlight module of the conventional display device because the backlight hole cannot provide backlight, thus failing to achieve a full-screen display.

The present application provides a backlight module, comprising:

a first backlight assembly and a second backlight assembly;

wherein a backlight hole is defined in the second backlight assembly, and at least a portion of the first backlight assembly is accommodated in the backlight hole;

wherein the first backlight assembly comprises a first light source and a light guide element for guiding a light beam of the first light source, which enters the light guide element, out of the backlight hole.

In the backlight module of the present application, the light guide element is filled at least in the backlight hole, and the first light source surrounds the light guide element;

wherein the light guide element comprises a first light-incident surface adjacent to the first light source, and the first light-incident surface is disposed at one side of the first light source adjacent to the backlight hole;

wherein an angle between the first light-incident surface of the light guide element and one side of the light guide element away from the backlight hole is greater than or equal to 90 degrees.

In the backlight module of the present application, the light guide element comprises a first recess surrounding the backlight hole, the first light source is disposed in the first recess, and the first light-incident surface is arranged between the first light source and the backlight hole.

In the backlight module of the present application, the first light source comprises a first light emitting surface, and the first light emitting surface is located on one side of the light source adjacent to the first light-incident surface.

In the backlight module of the present application, the first backlight assembly further comprises a plurality of diffusion units arranged on the first light-incident surface, and the diffusion units are configured to cause light emitted from the first light source to have an increased range of angles of refraction at the first light-incident surface.

In the backlight module of the present application, the diffusion units are a plurality of prisms and/or a plurality of protrusions of the light guide element protruding towards the first light source.

In the backlight module of the present application, the first backlight assembly further comprises a first lens disposed between the first light source and the light guide element; and the first lens is disposed corresponding to the first light source, and the first lens is configured to converge light from the first light source, so that light from the first light source enters the light guide element through the first light-incident surface.

In the backlight module of the present application, the backlight module further comprises a reflective layer, and the reflective layer is disposed between the first backlight assembly and the second backlight assembly.

In the backlight module of the present application, the reflective layer comprises a first sub-light-reflective layer and a first sub-light-absorbent layer, and the first sub-light-absorbent layer is arranged on one side of the first sub-light-reflective layer away from the first backlight assembly.

In the backlight module of the present application, a material of the light guide element is a colorless transparent material.

The present application further provides a display device, comprising:

a display panel and a backlight module arranged at one side of the display panel;

wherein a backlight hole of the backlight module comprises a first side at one side close to the display panel, and a light guide element of the backlight module comprises a first light-emergent surface close to the first side and a second light-emergent surface away from the first side; and the first light-emergent surface is parallel to the first side, and/or the second light-emergent surface is parallel to the first side.

In the display device of the present application, the light guide element further comprises a plurality of light converging units located on the first light-emergent surface and/or the second light-emergent surface; and the light converging units are configured to increase brightness of light emitted from the first light-emergent surface to the display panel.

In the display device of the present application, the light converging unit is symmetrically arranged with respect to a first symmetry axis of the display panel along a first direction and/or a second symmetry axis of the display panel in a second direction; and wherein the first direction is parallel to an extension direction of a scan line of the display device, and the second direction is parallel to an extension direction of a data line of the display device.

In the display device of the present application, the light converging unit is a dot microstructure.

In the display device of the present application, a diameter of the dot microstructure ranges from 16 micrometers to 120 micrometers, and a depth of the dot microstructure ranges from 0.8 micrometers to 12 micrometers.

In the display device of the present application, the display device further comprises an outer frame located on one side of the first backlight assembly of the backlight module away from the display panel, and the outer frame is configured to fix the first backlight assembly in the backlight hole.

In the display device of the present application, the display device further comprises a functional assembly arranged at one side of the first backlight assembly of the backlight module away from the display panel, and a signal receiving end of the functional assembly is arranged corresponding to the backlight hole;

the display device further comprises a control component electrically connected to the functional assembly and the first light source;

when the functional assembly is in operation, the control component controls the first light source to be in an off state, and the backlight hole serves as a signal receiving channel of the functional assembly; and when the functional assembly is not in operation, the control component controls the first light source to turn on, and the light guide element is configured to uniformly distribute light from the first light source in the backlight hole.

In the display device of the present application, the display device comprises a lighting region and a non-lighting region surrounding the lighting region, and the backlight hole is defined in the lighting region; and the display panel comprises a color filter layer, and a distribution density of color resists of the color filter layer in the lighting region is less than a distribution density of color resists of the color filter layer in the non-lighting region.

In the display device of the present application, a gap between metal traces of the display panel in the lighting region is greater than a gap between metal traces of the display panel in the non-lighting region.

In the display device of the present application, a number of thin film transistors of the display panel in the lighting region is less than a number of thin film transistors of the display panel in the non-lighting region.

Through the arrangement of the first light source and the light guide element, the light guide element is used to uniformly distribute the light from the first light source in the backlight hole when the signal receiving end of the optical assembly does not need to receive ambient light signals, so that the display panel can display normally in an area corresponding to the backlight hole, and full-screen display operations of the display device are realized.

BRIEF DESCRIPTION OF DRAWINGS

The following describes specific embodiments of the present application in detail with reference to the accompanying drawings, which will make the technical solutions and advantages of the present application obvious.

DETAILED DESCRIPTION OF EMBODIMENTS

In order to make the purpose, technical solutions and effects of the present application clearer, the following description is provided with reference to the accompanying drawings and in conjunction with specific embodiments. It should be understood that the specific embodiments described herein are only used to explain the present application, and not used to limit the present application.

A backlight hole in a backlight module of a conventional display device is only used as a channel for receiving ambient light and cannot provide backlight for the display panel in a corresponding area, thus leading to a problem that the display device cannot achieve full-screen displays. In order to solve this problem, the present application provides a backlight module and a display device.

Referring to FIGS. 1 to 6, a backlight module 102 comprises: a first backlight assembly 104 and a second backlight assembly.

A backlight hole 103 is defined in the second backlight assembly, and at least a portion of the first backlight assembly 104 is accommodated in the backlight hole 103.

The first backlight assembly 104 comprises a first light source 105 and a light guide element 106 for guiding a light beam of the first light source 105, which enters the light guide element 106, out of the backlight hole 103.

Figure 1:
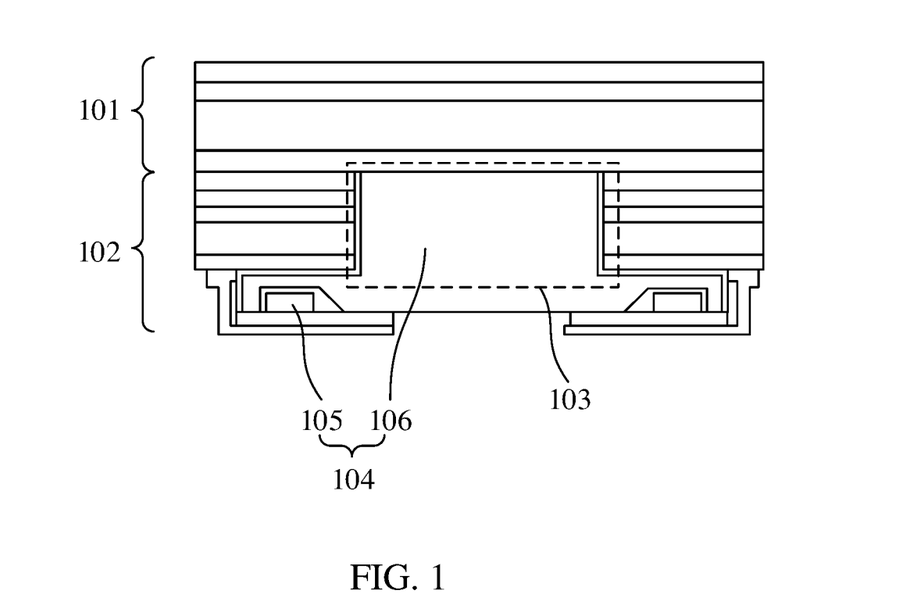
FIG. 1 is a schematic structural view illustrating a display device of the present application.

In the present embodiment, when the backlight module 102 is used in a display device 100, the light guide element 106 is used to guide the light beam entering the light guide element 106 to an area of the display panel 101 corresponding to the backlight hole 103.

In the present embodiment, the display device 100 further comprises a functional assembly arranged at one side of the first backlight assembly 104 away from the display panel 101, and a signal receiving end of the functional assembly is arranged corresponding to the backlight hole 103. The functional assembly can be an optical assembly.

In the present embodiment, the display device 100 includes a lighting region and a non-lighting region surrounding the lighting region. The backlight hole 103 and the signal receiving end of the functional assembly are located in the lighting region.

The display device 100 further comprises a control component electrically connected to the functional assembly and the first light source 105.

When the functional assembly is in operation, the control component controls the first light source 105 to be in an off state, and the backlight hole 103 serves as a signal receiving channel of the functional assembly. When the functional assembly is not in operation, the control component controls the first light source 105 to turn on, and the light guide element 106 is configured to uniformly distribute light from the first light source 105 in the backlight hole 103. The display panel 101 displays normally in the lighting region, and the display device 100 achieves a full-screen display.

In the present embodiment, the light guide element 106 is made of a colorless and transparent material, and a material of the light guide element 106 can be polycarbonate, polymethyl methacrylate, tempered glass, or other colorless and transparent materials.

In the present embodiment, the first light source 105 can be a mini-light-emitting diode or a micro-light-emitting diode.

In the present embodiment, the first light source 105 is arranged at one side of the backlight hole 103 away from the display panel 101, and the first light source 105 can be arranged in the lighting region or the non-lighting region; however, the present application is not limited in this regard.

In the present embodiment, the backlight module 102 further comprises a second backlight assembly. The second backlight assembly comprises a second light source and an optical film set. The optical film set comprises, along a direction toward the display panel 101, a first optical film, a second optical film, a third optical film, and a fourth optical film which are arranged in sequence. The first optical film, the second optical film, the third optical film, and the fourth optical film are used for reflecting, guiding, and diffusing the light emitted by the second light source, and enhancing brightness.

When the first light source 105 is arranged in the non-lighting region, the first light source 105 can be located on one side of the first optical film away from the display panel 101. When the first light source 105 is arranged in the lighting region, the first light source 105 and the second light source 105 can be arranged in the same layer.

In the present embodiment, the display panel 101 can comprise a color filter layer. The color filter layer includes a red color resist, a green color resist, and a blue color resist. A distribution density of the color resists of the color filter layer in the lighting region is less than a distribution density of the color resists of the color filter layer in the non-lighting region, so as to improve transmittance of ambient light in the lighting region.

Alternatively, the color filter layer is not provided with any color resist in the lighting region, so as to increase the transmittance of ambient light in the lighting region. Under this condition, the first light source 105 can be composed of a first red sub-light source, a first green sub-light source, and a first blue sub-light source. When the first light source 105 adopts an RGB three-color arrangement, a driving frequency of the display panel 101 in the lighting region can be increased, and a color display in the lighting region can be performed in a manner like that of a field sequential color liquid crystal display. The field sequential color liquid crystal display refers to using an inverter to drive a RGB backlight source to illuminate in sequence, and the same pixel provides three color lights (R, G, and B) in sequence, so that eye's persistence of vision causes mixing of the three colors, as if the pixel is continuously illuminated, so as to achieve a full-color display.

In the present application, by having the first light source 105 and the light guide element 106, when the signal receiving end of the optical assembly does not need to receive ambient light signals, the light guide element 106 is used to uniformly distribute the light from the first light source 105 in the backlight hole 103, so that an area of the display panel 101 corresponding to the backlight hole 103 can display normally, and thereby a full-screen display of the display device 100 is realized.

The technical solution of the present application is described in conjunction with specific embodiments.

First Embodiment

Figure 2:
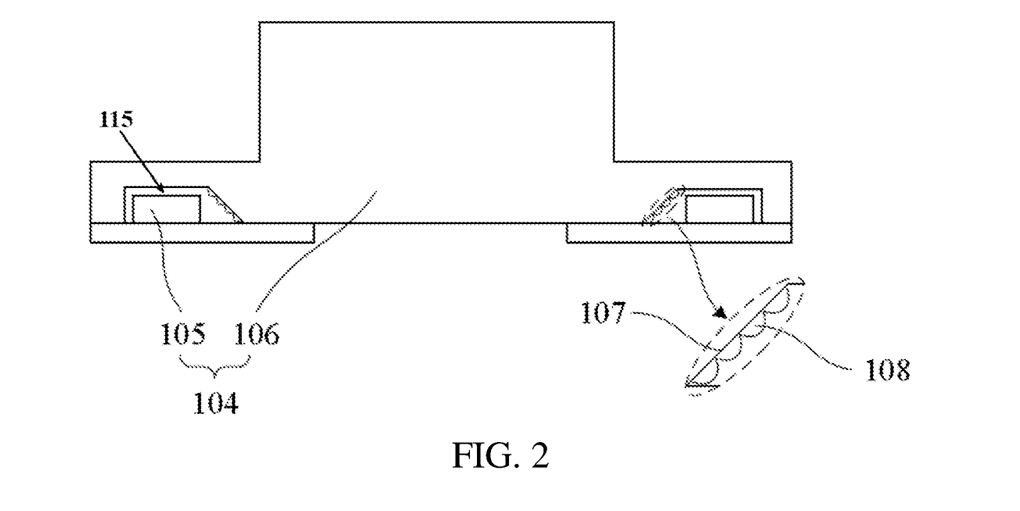
FIG. 2 is a schematic view illustrating a first backlight assembly of the display device according to a first embodiment of the present application.

Referring to FIG. 2, the light guide element 106 is filled at least in the backlight hole 103, and the first light source 105 surrounds the light guide element 106.

The light guide element 106 comprises a first light-incident surface 107 adjacent to the first light source 105, and the first light-incident surface 107 is disposed at one side of the first light source 105 adjacent to the backlight hole 103.

An angle between the first light-incident surface 107 of the light guide element 106 and one side of the light guide element 106 away from the backlight hole 106 is greater than or equal to 90 degrees.

In the present embodiment, the light guide element 106 comprises a first recess 115 surrounding the backlight hole 103, the first light source 105 is disposed in the first recess 115, and the first light-incident surface 107 is arranged between the first light source 105 and the backlight hole 103.

In the present embodiment, when the first light source 105 is located in the non-lighting region, the first light source 105 is located at one side of the first optical film away from the display panel 101, so the light emitted by the first light source 105 needs to be guided into the light guide element 106 through the first light-incident surface 107 of the light guide element 106 to achieve uniform distribution in the backlight hole 103, and then emits uniformly from one side of the backlight hole 103 close to the display panel 101, so that the display panel 101 in the lighting region displays normally.

When the angle between the first light-incident surface 107 and one side of the backlight hole 103 away from the display panel 101 is greater than 90 degrees, a total amount of light emitted by the first light source 105 and entering the light guide element 106 from the first light-incident surface 107 is increased. Due to the included angle greater than 90 degrees between the first light-incident surface 107 and the side of the backlight hole 103 away from the display panel 101, the light of the first light source 105 has an increased range of angles of refraction at the first light-incident surface 107, which is conducive to the uniform distribution of the light of the first light source 105 in the backlight hole 103 when the signal receiving end of the optical assembly does not need to receive the ambient light signal, so that the display panel 101 in the lighting region is supplied with uniform backlight with sufficient brightness, the display panel 101 in the lighting region can display normally, and a full-screen display of the display device 100 is realized.

In the present embodiment, the first backlight assembly 104 further comprises a plurality of diffusion units 108 arranged on the first light-incident surface 107, and the diffusion units 108 are configured to cause light from the first light source 105 to have an increased range of angles of refraction at the first light-incident surface.

In the present embodiment, the diffusion units 108 can be continuously distributed on the first light-incident surface 107 over its entire surface.

In the present embodiment, the diffusion units 108 can be integrally formed with the light guide element 106.

In the present embodiment, the adjacent diffusion units 108 are arranged parallel to each other.

In the present embodiment, the diffusion units 108 are prisms and/or protrusions of the light guide element 106, which protrude toward the first light source 105.

When the diffusion unit 108 is a prism, the prism can be a triangular prism or other polygonal prism which functions to cause the light from the first light source 105 to have an increased range of angles of refractions at the first light-incident surface 107.

When the prism is a triangular prism, any side of the prism is located on the first light-incident surface 107.

The arrangement of the diffusion units 108 causes the light from the first light source 105 to have an increased range of angles of refraction at the first light-incident surface 107. Therefore, when the signal receiving end of the optical assembly does not need to receive ambient light signals, the light of the first light source 105 is uniformly distributed in the backlight hole 103 to provide sufficient and uniform backlight to the display panel 101 in the lighting region, and as a result, the display panel 101 in the lighting region can display normally to realize a full-screen display of the display device 100.

In the present embodiment, the first light source 105 can have multiple first light-emitting surfaces, or can have only one first light-emitting surface. When the first light source 105 has only one first light-emitting surface, the first light-emitting surface is located on one side close to the first light-incident surface 107.

In the present embodiment, the first backlight assembly 104 further comprises a first lens disposed between the first light source 105 and the light guide element 106.

The first lens is arranged corresponding to the first light source 105, and the first lens is used to converge the light of the first light source 105, so that the light of the first light source 105 enters the light guide element 106 through the first light-incident surface 107.

Since the light emitted by the first light source 105 diverges in all directions, the converging function of the first lens can increase a total amount of light entering the light guide element 106 through the first light-incident surface 107, so as to provide a backlight with sufficient and uniform brightness to the display panel 101 in the lighting region.

In the present embodiment, the light of the first light source 105 is guided into the light guide element 106 through the first light-incident surface 107 of the light guide element 106. When the signal receiving end of the optical assembly does not need to receive the ambient light signals, the light guide element 106 is used to uniformly distribute the light from the first light source 105 in the backlight hole 103, so that the display panel 101 can display normally in an area corresponding to the backlight hole 103, and a full-screen display of the display device 100 is realized.

Second Embodiment

Figure 3:
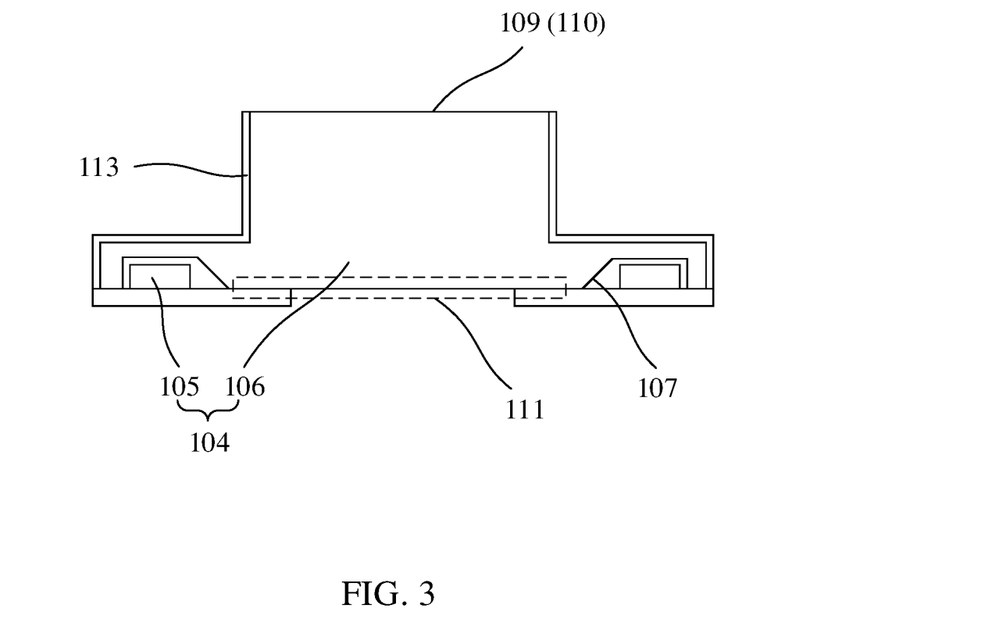
FIG. 3 is a schematic view illustrating the first backlight assembly of the display device according to a second embodiment of the present application.

Referring to FIG. 3, the second embodiment is the same or similar to the first embodiment, and the difference lies in that: the backlight module 102 further comprises a reflective layer 113, and the reflective layer 113 is disposed between the first backlight assembly 104 and the second backlight assembly.

In the present embodiment, the reflective layer 113 can include a first sub-light-reflective layer. A material of the first sub-reflective layer can be a silver reflective material, such as silver, or other material capable of reflecting light.

The first sub-light-reflective layer is arranged, so that when the signal receiving end of the optical assembly does not need to receive ambient light signals, the light that is guided out of the light guide element 106 to one side of the backlight hole 103 near the second backlight assembly in the non-lighting region is reflected back to the light guide element 106 or directly reflected to one side of the backlight hole 103 near the display panel 101, thus providing sufficient light to the display panel 101 in the lighting region to realize normal display operations of the display panel 101 in the lighting region and also reducing a loss of the light from the first light source 105 in the light guide element 106 and the backlight hole 103 to improve a utilization rate of the light from the first light source 105 and reduce energy consumption. At the same time, the first sub-light-reflective layer can also reflect light from the second light source located in the non-lighting region, so as to avoid interference from the second light source when the signal receiving end of the optical assembly needs to receive ambient light signals.

Alternatively, in the present embodiment, the reflective layer 113 can further include a first sub-light-absorbent layer arranged on one side of the first sub-light-reflective layer away from the light guide element 106. A material of the first sub-light-absorbent layer can be a gray or black light-absorbing material, which is used to absorb light from the second light source located in the non-lighting region to prevent the light of the second light source from causing interference to the reception of ambient light by the signal receiving end of the optical assembly when the signal receiving end of the optical assembly needs to receive ambient light signals, thus avoiding affecting the product quality of the display device 100.

In the present embodiment, the arrangement of the reflective layer 113 reduces the loss of the light from the first light source 105 in the light guide element 106 and the backlight hole 103, and improves a utilization rate of the light of the first light source 105. At the same time, the arrangement of the reflective layer 113 prevents the second light source located in the non-lighting region from interfering with the reception of the ambient light by the signal receiving end of the optical assembly, thereby improving the product quality of the display device 100.

In all the above embodiments, by means of the arrangement of the first light source 105 and the light guide element 106, the light guide element 106 is used to uniformly distribute the light from the first light source 105 in the backlight hole 103 when the signal receiving end of the optical assembly does not need to receive the ambient light signal, so that the display panel 101 can display normally in an area corresponding to the backlight hole 103 to realize a full-screen display of the display device 100.

Referring to FIGS. 1 to 6, the present application also provides a display device. The display device comprises a display panel and a backlight module located on one side of the display panel.

Figure 4:
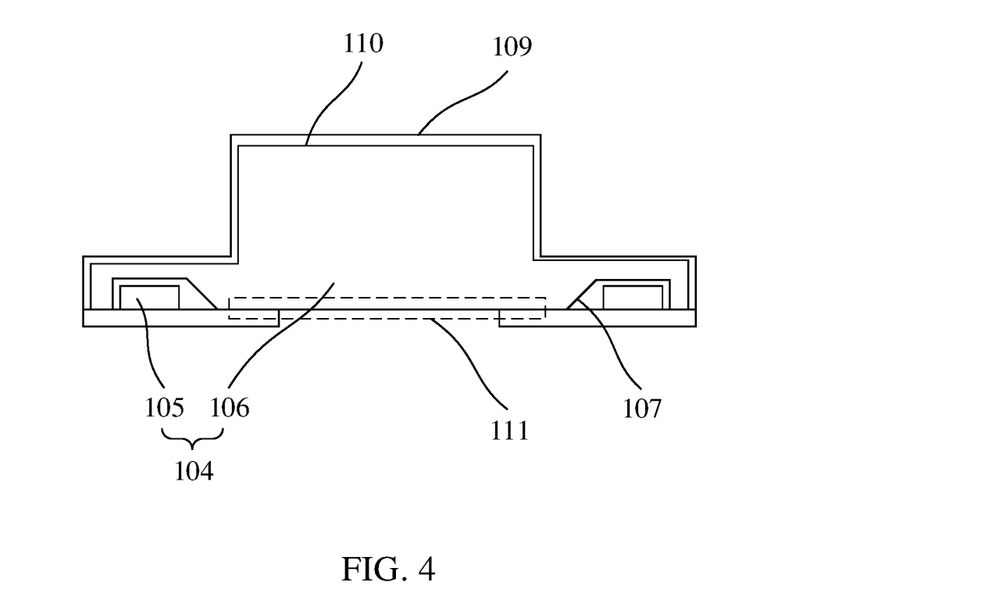
FIG. 4 is a schematic view illustrating the first backlight assembly of the display device according to a third embodiment of the present application.

Referring to FIG. 4, in the present embodiment, the backlight hole 103 of the backlight module 102 comprises a first side 109 near the display panel 101, and the light guide element 106 of the backlight module 102 comprises a first light-emergent surface 110 close to the first side 109 and a second light-emergent surface 111 close to the first side 109.

The first light-emergent surface 110 is parallel to the first side 109, and/or the second light-emergent surface 111 is parallel to the first side 109.

In the present embodiment, the first light-emergent surface 110 and the first side 109 can have a first overlapping portion.

The first light-emergent surface 110 and the first side 109 can overlay.

When the first light-emergent surface 110 and the first side 109 overlay each other, the light guide element 106 can fill a space of the backlight hole 103, which facilitates uniform distribution of the light from the first light source 105 in the backlight hole 103.

In the present embodiment, the first light-emergent surface 110 and/or the second light-emergent surface 111 can be a smooth surface. When the first light-emergent surface 110 and the second light-emergent surface 111 are smooth surfaces, the present application can avoid a condition that when the signal receiving end of the optical assembly needs to receive ambient light signals, the ambient light is scattered from the first light-emergent surface 110 or the second light-emergent surface 111, which results in distortion of the ambient light signals received by the signal receiving end of the optical assembly, leads to unclear shooting pictures when the optical assembly is used for shooting or camera functions, and hence affects the product quality of the display device 100.

By arranging the first light-emergent surface 110, the second light-emergent surface 111, and the first side 109 parallel to each other, the present application avoids a condition that when the signal receiving end of the optical assembly needs to receive the ambient light signals, the ambient light deflects after passing through the light guide element 106 and the deflection of light causes distortion of the ambient light signals received by the signal receiving end of the optical assembly, which affects the product quality of the display device 100.

In the display device 100 of the present application, by means of the arrangement of the first light source 105 and the light guide element 106, the light guide element 106 is used to make the light from the first light source 105 to be uniformly distributed in the backlight hole 103 when the signal receiving end of the optical assembly does not need to receive the ambient light signals, so that the display panel 101 can display normally in an area corresponding to the backlight hole 103 to realize a full-screen display of the display device 100.

The technical solution of the present application is described in conjunction with specific embodiments.

Third Embodiment

Figure 5:
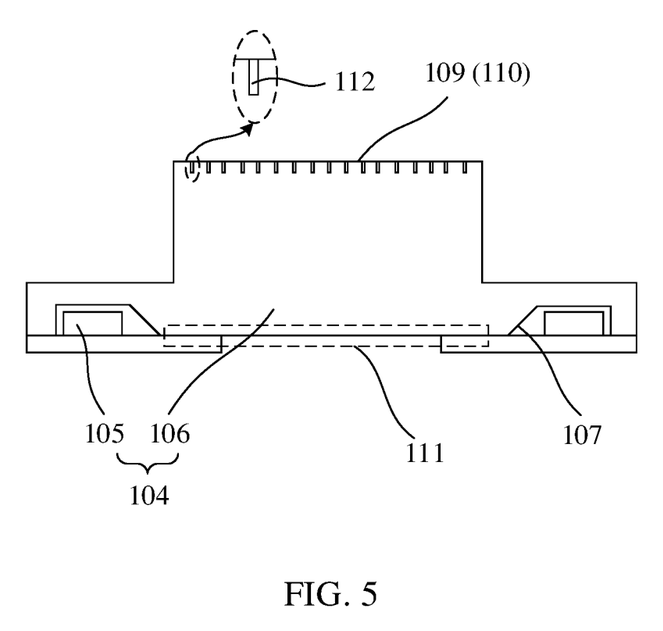
FIG. 5 is a schematic view illustrating the first backlight assembly of the display device according to a fourth embodiment of the present application.

Referring to FIG. 5, the present embodiment is the same as or similar to the foregoing embodiment, except that:

In the third embodiment, the light guide element 106 further comprises a plurality of light converging units 112 located on the first light-emergent surface 110 and/or the second light-emergent surface 111.

The light converging units 112 are configured to increase brightness of light emitted from the first light-emergent surface 110 to the display panel 101.

In the present embodiment, the light converging units 112 are preferably arranged on the first light-emergent surface 110.

In the present embodiment, the light converging unit 112 is a dot microstructure.

A diameter of the dot microstructure can range from 16 to 120 microns, preferably from 20 to 100 microns. When the diameter of the dot microstructure is less than 16 microns, it is difficult to enhance the brightness of the light emitted from the first light-emergent surface 110 to the display panel 101. When the diameter of the dot microstructure is greater than 120 microns, the diameter of the dot microstructure is too large and affects surface smoothness of the first light-emergent surface 110 and/or the second light-emergent surface 111, resulting in distortion of the ambient light signals received by the signal receiving end of the optical assembly when the signal receiving end of the optical component needs to receive ambient light signals, which affects the product quality of the display device 100. When the diameter of the dot microstructure ranges from 20 to 100 microns, the diameter of the dot microstructure is not too small to enhance the brightness of the light emitted from the first light-emergent surface 110 to the display panel 101, and the diameter of the dot microstructure is not large enough to affect the surface smoothness of the first light-emergent surface 110 and/or the second light-emergent surface 111.

The depth of the dot microstructure ranges from 0.8 to 12 microns, preferably from 1 to 10 microns. When the depth of the dot microstructure is less than 0.8 μm, the depth of the dot microstructure is too small to well enhance the brightness of the light emitted from the first light-emergent surface 110 to the display panel 101; when the depth of the dot microstructure is greater than 12 microns, the depth of the dot microstructure is too large, and therefore, when the signal receiving end of the optical assembly needs to receive ambient light signals, the ambient light is significantly refracted or scattered in the dot microstructure, resulting in distortion of the ambient light signals received by the signal receiving end of the optical assembly, which affects the product quality of the display device 100. When the depth of the dot microstructure ranges from 1 to 10 microns, the depth of the dot microstructure is not too small to enhance the brightness of the light emitted from the first light-emergent surface 110 to the display panel 101, and the depth of the dot microstructure is not large enough to cause distortion of the ambient light signals received by the signal receiving end of the optical assembly.

In the present embodiment, the light converging units 112 are symmetrically arranged with respect to a first symmetry axis of the display panel 101 along a first direction and/or a second symmetry axis along a second direction.

The first direction is parallel to an extension direction of a scan line of the display device 100, and the second direction is parallel to an extension direction of a data line of the display device 100.

The arrangement of the light converging units 112 increases the amount of light emitted from the light converging units 112 to the display panel 101, thereby enhancing the brightness of the light emitted from the first light-emergent surface 110 to the display panel 101. Therefore, the symmetrical arrangement of the light converging units 112 about the first symmetry axis and/or the second symmetry axis is beneficial to provide light with sufficient and uniform brightness to the display device 100 in the lighting region. As a result, the display device 100 in the lighting region can uniformly display when the signal receiving end of the optical assembly does not need to receive the ambient light signal, which realizes the full-screen display operations of the display device 100 and improves display quality of the display device 100.

In the present embodiment, through the arrangement of the light converging units 112, the brightness of the light emitted from the first light-emergent surface 110 to the display panel 101 is enhanced, which is beneficial to realize the full-screen displays of the display device 100 and also improve the product quality of the display device 100.

Fourth Embodiment

Figure 6:
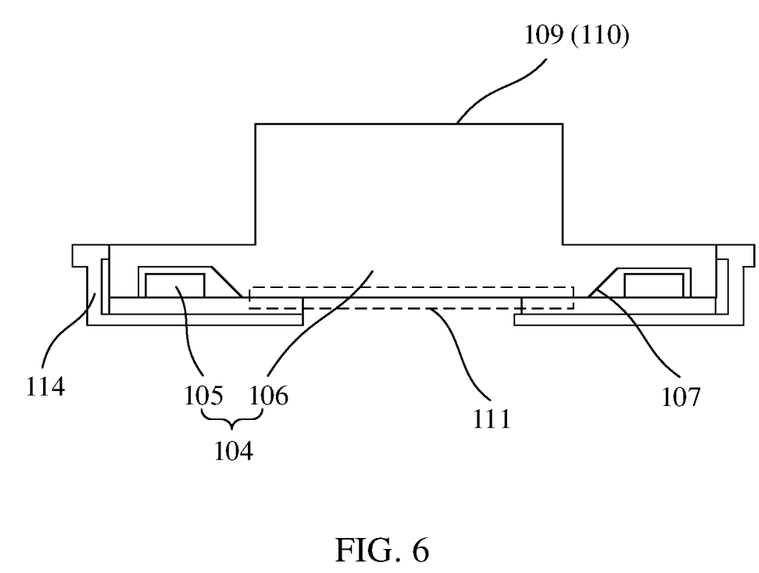
FIG. 6 is a schematic structural view illustrating an outer frame of the display device of the present application.

Referring to FIG. 6, the fourth embodiment is the same as or similar to the foregoing embodiment, and the difference lies in that:

The display device 100 further includes an outer frame 114 located on one side of the backlight hole 103 away from the display panel 101, and the outer frame 114 is used to fix the first backlight assembly 104 of the backlight module in the backlight hole 103.

In the present embodiment, the outer frame 114 and the reflective layer 113 can have a first overlapping portion.

In the present embodiment, a material of the outer frame 114 can be a light-absorbent material or a light-reflective material. While the outer frame 114 fixes the first backlight assembly 104, the light from the first light source 105 can be absorbed or reflected to prevent the light of the first light source 105 from leaking from one side of the first backlight assembly 104 away from the display panel 101, thus improving the product quality of the display device 100.

In the present embodiment, the outer frame 114 comprises a first opening corresponding to the signal receiving end of the functional assembly. When the signal receiving end of the optical assembly needs to receive the ambient light signals, the ambient light reaches the signal receiving end of the optical assembly through the first opening, thus preventing the outer frame 114 from absorbing or reflecting the ambient light, which improves the sensitivity of the optical assembly.

In the present embodiment, through the arrangement of the outer frame 114, the first backlight assembly 104 is fixed in the backlight hole 103 to prevent the first backlight assembly 104 from loosening or detaching from the backlight hole 103 to affect the product quality of the display device 100.

In the foregoing embodiment, a gap between metal traces of the display panel 101 in the lighting region can be greater than a gap between metal traces of the display panel 101 in the non-lighting region. Alternatively, a width of a black matrix of the display panel 101 in the lighting region can be less than a width of the black matrix of the display panel 101 in the non-lighting region. Alternatively, a number of thin film transistors (TFTs) of the display panel 101 in the lighting region can be less than a number of TFTs of the display panel 101 in the non-lighting region. The above configurations are all conducive to improving a transmittance of ambient light in the lighting region, increasing a total amount of ambient light that can reach the signal receiving end of the optical assembly, improving the sensitivity of the optical assembly, and improving the product quality of the display device 100.

The present application provides a backlight module and a display device. The backlight module comprises a first backlight assembly and a second backlight assembly. The second backlight assembly is provided with a backlight hole, and at least a portion of the first backlight assembly is accommodated in the backlight hole. The first backlight assembly includes a first light source and a light guide element, and the light guide element is used for guiding a light beam from the first light source, which enters the light guide element, out of the backlight hole. Through the arrangement of the first light source and the light guide element, the light guide element uniformly distributes the light from the first light source in the backlight hole when the signal receiving end of the optical assembly does not need to receive ambient light signals, so that the display panel can display normally in an area corresponding to the backlight hole, thus realizing full-screen display operations of the display device.

It can be understood that those of ordinary skill in the art can make equivalent replacements or changes according to the technical solution and inventive concept of the present application, and all such changes or replacements should be deemed to fall within the protection scope defined by the appended claims of the present application.

What is claimed is:

1. A backlight module, comprising:
a first backlight assembly and a second backlight assembly;
wherein a backlight hole is defined in the second backlight assembly, and at least a portion of the first backlight assembly is accommodated in the backlight hole;
wherein the first backlight assembly comprises a first light source and a light guide element for guiding a light beam of the first light source, which enters the light guide element, out of the backlight hole, the light guide element is filled at least in the backlight hole, and the first light source is disposed around a periphery of the light guide element; and
wherein the light guide element comprises a first light-incident surface and a first recess, the first recess surrounds the backlight hole, the first light source is disposed in the first recess, the first light-incident surface is adjacent to the first light source and is disposed at one side of the first light source close to the backlight hole.

2. The backlight module according to claim 1, wherein an angle between the first light-incident surface of the light guide element and one side of the light guide element away from the backlight hole is greater than or equal to 90 degrees.

3. The backlight module according to claim 2, wherein the first light-incident surface is arranged between the first light source and the backlight hole.

4. The backlight module according to claim 2, wherein the first light source comprises a first light emitting surface, and the first light emitting surface is located on one side of the light source adjacent to the first light-incident surface.

5. The backlight module according to claim 2, wherein the first backlight assembly further comprises a plurality of diffusion units arranged on the first light-incident surface, and the diffusion units are configured to cause light emitted from the first light source to have an increased range of angles of refraction at the first light-incident surface.

6. The backlight module according to claim 5, wherein the diffusion units are a plurality of prisms and/or a plurality of protrusions of the light guide element protruding towards the first light source.

7. The backlight module according to claim 2, wherein the first backlight assembly further comprises a first lens disposed between the first light source and the light guide element;
the first lens is disposed corresponding to the first light source, and the first lens is configured to converge light from the first light source, so that light from the first light source enters the light guide element through the first light-incident surface.

8. The backlight module according to claim 1, wherein the backlight module further comprises a reflective layer, and the reflective layer is disposed between the first backlight assembly and the second backlight assembly.

9. The backlight module according to claim 8, wherein the reflective layer comprises a first sub-light-reflective layer and a first sub-light-absorbent layer, and the first sub-light-absorbent layer is arranged on one side of the first sub-light-reflective layer away from the first backlight assembly.

10. The backlight module according to claim 1, wherein a material of the light guide element is a colorless transparent material.

11. A display device, comprising:
a display panel;
a backlight module arranged at one side of the display panel, the backlight module comprising a first backlight assembly and a second backlight assembly; and a functional assembly arranged at one side of the first backlight assembly of the backlight module away from the display panel;

wherein a backlight hole is defined in the second backlight assembly, and at least a portion of the first backlight assembly is accommodated in the backlight hole;

wherein the first backlight assembly comprises a first light source and a light guide element for guiding a light beam of the first light source, which enters the light guide element, out of the backlight hole, the light guide element is filled at least in the backlight hole, and the first light source is disposed around a periphery of the light guide element;

wherein a backlight hole of the backlight module comprises a first side at one side close to the display panel, and a light guide element of the backlight module comprises a first light-emergent surface close to the first side and a second light-emergent surface away from the first side;

wherein the first light-emergent surface is parallel to the first side, and/or the second light-emergent surface is parallel to the first side;

wherein a signal receiving end of the functional assembly is arranged corresponding to the backlight hole; the display device further comprises a control component electrically connected to the functional assembly and the first light source; when the functional assembly is in operation, the control component controls the first light source to be in an off state, and the backlight hole serves as a signal receiving channel of the functional assembly; and when the functional assembly is not in operation, the control component controls the first light source to turn on, and the light guide element is configured to uniformly distribute light from the first light source in the backlight hole.

12. The display device according to claim 11, wherein the light guide element further comprises a plurality of light converging units located on the first light-emergent surface and/or the second light-emergent surface; and the light converging units are configured to increase brightness of light emitted from the first light-emergent surface to the display panel.

13. The display device according to claim 12, wherein the light converging unit is symmetrically arranged with respect to a first symmetry axis of the display panel along a first direction and/or a second symmetry axis of the display panel in a second direction; and wherein the first direction is parallel to an extension direction of a scan line of the display device, and the second direction is parallel to an extension direction of a data line of the display device.

14. The display device according to claim 12, wherein the light converging unit is a dot microstructure.

15. The display device according to claim 14, wherein a diameter of the dot microstructure ranges from 16 micrometers to 120 micrometers, and a depth of the dot microstructure ranges from 0.8 micrometers to 12 micrometers.

16. The display device according to claim 11, wherein the display device further comprises an outer frame located on one side of the first backlight assembly of the backlight module away from the display panel, and the outer frame is configured to fix the first backlight assembly in the backlight hole.

17. The display device according to claim 11, wherein a number of thin film transistors of the display panel in the lighting region is less than a number of thin film transistors of the display panel in the non-lighting region.

18. The display device according to claim 11, wherein the display device comprises a lighting region and a non-lighting region surrounding the lighting region, and the backlight hole is defined in the lighting region; and the display panel comprises a color filter layer, and a distribution density of color resists of the color filter layer in the lighting region is less than a distribution density of color resists of the color filter layer in the non-lighting region.

19. The display device according to claim 11, wherein a gap between metal traces of the display panel in the lighting region is greater than a gap between metal traces of the display panel in the non-lighting region.

* * * * *